(12) United States Patent
Ishikawa et al.

(10) Patent No.: US 11,120,558 B2
(45) Date of Patent: Sep. 14, 2021

(54) HUMAN DETECTION SYSTEM FOR WORK VEHICLE, AND WORK VEHICLE EQUIPPED WITH SAME

(71) Applicant: TADANO LTD., Kagawa (JP)

(72) Inventors: Iwao Ishikawa, Kagawa (JP); Tomohiro Toyosaki, Kagawa (JP); Masafumi Takahashi, Kagawa (JP)

(73) Assignee: TADANO LTD., Kagawa (JP)

( * ) Notice: Subject to any disclaimer, the term of this patent is extended or adjusted under 35 U.S.C. 154(b) by 161 days.

(21) Appl. No.: 16/488,070

(22) PCT Filed: Mar. 9, 2018

(86) PCT No.: PCT/JP2018/009293
§ 371 (c)(1),
(2) Date: Aug. 22, 2019

(87) PCT Pub. No.: WO2018/164273
PCT Pub. Date: Sep. 13, 2018

(65) Prior Publication Data
US 2020/0250831 A1    Aug. 6, 2020

(30) Foreign Application Priority Data

Mar. 10, 2017    (JP) .............................. JP2017-046830

(51) Int. Cl.
*G06K 9/00*    (2006.01)
*H04N 7/18*    (2006.01)
(Continued)

(52) U.S. Cl.
CPC .................. *G06T 7/20* (2013.01); *B60R 1/00* (2013.01); *B66C 13/16* (2013.01); *B66C 15/065* (2013.01);
(Continued)

(58) Field of Classification Search
USPC ................ 382/100, 103, 106–107, 104, 123, 382/154–155, 162, 168, 173, 181, 199,
(Continued)

(56) References Cited

U.S. PATENT DOCUMENTS 9,840,197 B2 *  12/2017  Baek ...................... H04N 7/188
10,366,512 B2 *  7/2019  Jeong ....................... B60R 1/00
(Continued)

FOREIGN PATENT DOCUMENTS

CN    105228941 A    1/2016
EP    2955915 A1    12/2015
(Continued)

OTHER PUBLICATIONS

Jun. 5, 2018, International Search Report issued for related PCT Application No. PCT/JP2018/009293.
Jun. 5, 2018, International Search Opinion issued for related PCT Application No. PCT/JP2018/009293.
Nov. 30, 2020, European Search Report issued for related EP Application No. 18763563.6.

*Primary Examiner* — Seyed H Azarian
(74) *Attorney, Agent, or Firm* — Paratus Law Group, PLLC

(57) ABSTRACT

A human detection system 18 includes: a camera 19 that acquires detection image data Dd of a detection region D, the detection region D being a prescribed region including a portion of a crane 1; a deviation determination unit 21c in which image data of the crane 1 included in the detection image data Dd acquired by the camera 19 in a state of being disposed at a reference position is set as reference image data Sd of the detection region D, and in which the detection image data Dd of the detection region D acquired at an arbitrary time by the camera 19 is compared to the reference image data Sd to determine whether the position of the camera 19 has deviated from the reference position; and a reporting unit 21d that reports that the position of the camera 19 has deviated.

2 Claims, 11 Drawing Sheets

(51) Int. Cl.
  *G06T 7/20* (2017.01)
  *G06T 7/73* (2017.01)
  *B60R 1/00* (2006.01)
  *B66C 13/16* (2006.01)
  *B66C 15/06* (2006.01)
  *E02F 9/24* (2006.01)
  *E02F 9/26* (2006.01)

(52) U.S. Cl.
  CPC ............... *G06T 7/74* (2017.01); *H04N 7/183* (2013.01); *B60R 2300/8093* (2013.01); *E02F 9/24* (2013.01); *E02F 9/261* (2013.01); *G06T 2207/10016* (2013.01); *G06T 2207/30252* (2013.01)

(58) Field of Classification Search
  USPC ............... 382/209, 219, 220, 232, 254, 276, 382/286–291, 305, 321; 348/144, 46, 94
  See application file for complete search history.

(56) References Cited

U.S. PATENT DOCUMENTS

| | | | |
|---|---|---|---|
| 2015/0249821 A1* | 9/2015 | Tanizumi | B66C 13/00 348/46 |
| 2016/0119589 A1* | 4/2016 | Tanizumi | B66C 13/16 348/144 |
| 2017/0309042 A1* | 10/2017 | Tanaka | B60R 1/00 |
| 2018/0258616 A1* | 9/2018 | Kiyota | G06T 1/20 |
| 2019/0093317 A1* | 3/2019 | Izumikawa | G06K 9/00771 |

FOREIGN PATENT DOCUMENTS

| | | |
|---|---|---|
| JP | 2014-082622 A | 5/2014 |
| JP | 2015-202835 A | 11/2015 |
| JP | 2016-013887 A | 1/2016 |
| JP | WO2014/073571 A1 | 9/2016 |

\* cited by examiner

HUMAN DETECTION SYSTEM FOR WORK VEHICLE, AND WORK VEHICLE EQUIPPED WITH SAME

CROSS REFERENCE TO PRIOR APPLICATION

This application is a National Stage Patent Application of PCT International Patent Application No. PCT/JP2018/009293 (filed on Mar. 9, 2018) under 35 U.S.C. § 371, which claims priority to Japanese Patent Application No. 2017-046830 (filed on Mar. 10, 2017), which are all hereby incorporated by reference in their entirety.

TECHNICAL FIELD

The present invention relates to a human detection system for a work vehicle, and a work vehicle provided with the same.

BACKGROUND ART

Conventionally, in work vehicles such as cranes and the like, the visual field of an operator from an operator's seat may be obstructed by a boom or the like stored in a vehicle during traveling. Some of the work vehicles include a camera for obtaining an image of an area corresponding to a blind spot from the operator's seat in order to secure the operator's visual field. Those work vehicles are configured to capture by the camera an image of the area unseeable from the operator's seat, and display the obtained image on a monitor at the operator's seat. Further, others of the work vehicles are known, which include an obstacle notification system that determines whether or not an obstacle is included in a specific area of an image obtained by a camera, and that notifies an operator of a result (see, e.g., Patent Literature (hereinafter, referred to as "PTL") 1).

In a work vehicle described in PTL 1 that is a rough terrain crane, a cabin as an operator's seat and a telescopic boom are mounted via a swivel base on a carrier having a traveling function. On the swivel base, the cabin is disposed on the right side in the traveling direction and the telescopic boom is disposed on the left side in the traveling direction. Accordingly, in the rough terrain crane, a blind spot occurs due to the telescopic arm obstructing the visual field of the operator from the driver's seat toward the left side in the traveling direction. Such a rough terrain crane includes an obstacle notification system in which a television camera (image data obtainment section) is disposed on the left side of the telescopic boom to obtain information on a monitored image of the area corresponding to the blind spot as a monitored region (detection region) and to display the information on a monitor in the cabin. The obstacle notification system treats, as a mask region, the main body portion of the rough terrain crane included in the monitored region, and excludes the mask region from detection region D for obstacle detection. This configuration makes it possible to reduce an erroneous determination of the obstacle within the monitored region.

The mask region of the obstacle notification system described in PTL 1 is defined by coordinates in the monitored image. Accordingly, in a case where an image capture region of the television camera is shifted, a part of the monitored region in which obstacle detection should be performed is regarded as the mask region on the monitored image, so that the obstacle notification system cannot detect the obstacle appropriately. To avoid this, the obstacle notification system needs to appropriately check whether the image capture region of the television camera is shifted, and, when the image capture region of the television camera is shifted, it is necessary to suitably adjust the attachment position of the television camera quickly.

CITATION LIST

Patent Literature

PTL 1
Japanese Patent Application Laid-Open No. 2016-13887

SUMMARY OF INVENTION

Technical Problem

An object of the present invention is to provide a human detection system and a work vehicle provided with the human detection system which can assist determination of whether or not a detection region for which image data is obtained by an image data obtainment section is shifted with respect to a reference region that is an image capture region at a reference position.

Solution to Problem

The technical problem to be solved by the present invention is as described above, and a solution to this problem will be described next.

That is, the human detection system is a human detection system for a work vehicle, the human detection system including: an image data obtainment section that obtains detection image data of a detection region, in which a predetermined region including a part of the work vehicle is set to be the detection region a shift determination section that determines whether a position of the image data obtainment section is shifted with respect to a reference position, the determination being made by comparison between the detection image data and reference image data of the detection region, the detection image data being obtained by the image data obtainment section at any time point, in which image data of the work vehicle included in the detection image data obtained by the image data obtainment section disposed at the reference position is set to be the reference image data of the detection region; and a notification section that notifies that the position of the image data obtainment section is shifted.

The human detection system further includes an image display section, in which, when the shift determination section determines that the position of the image data obtainment section is shifted, a confirmatory figure based on the reference image data is displayed on the image display section in such a manner as to be superimposed on image data of the detection region.

In the human detection system, a shift width confirmatory figure indicating a tolerable shift width for the detection region is displayed together in the confirmatory figure.

The work vehicle is a work vehicle including the human detection system for the work vehicle,

Advantageous Effects of Invention

The present invention produces effects as described below
The human detection system and the work vehicle provided with the human detection system continually detect whether or not the detection region is shifted. It is thus possible to assist determination of whether or not the detection region for which image data is obtained by the image data obtainment section is shifted with respect to the reference region that is the image capture region at the reference position.

The human detection system and the work vehicle provided with the human detection system visually indicate whether or not the detection region is shifted. It is thus possible to assist determination of whether or not the detection region for which image data is obtained by the image data obtainment section is shifted with respect to the reference region that is the image capture region at the reference position, The human detection system and the work vehicle provided with the human detection system visually indicate whether or not the shift of the detection region is within a tolerable range. It is thus possible to assist determination of whether or not the detection region for which image data is obtained by the image data obtainment section is shifted with respect to the reference region that is the image capture region at the reference position.

DESCRIPTION OF EMBODIMENTS

Hereinafter, a description will be given of crane 1 according to one embodiment of a work vehicle rence to FIGS. 1 and 2. Note that, although the present embodiment will be described in relation to a mobile crane (rough terrain crane) as the work vehicle, crane 1 only have to be an operator-on-board work vehicle.

Figure 1:
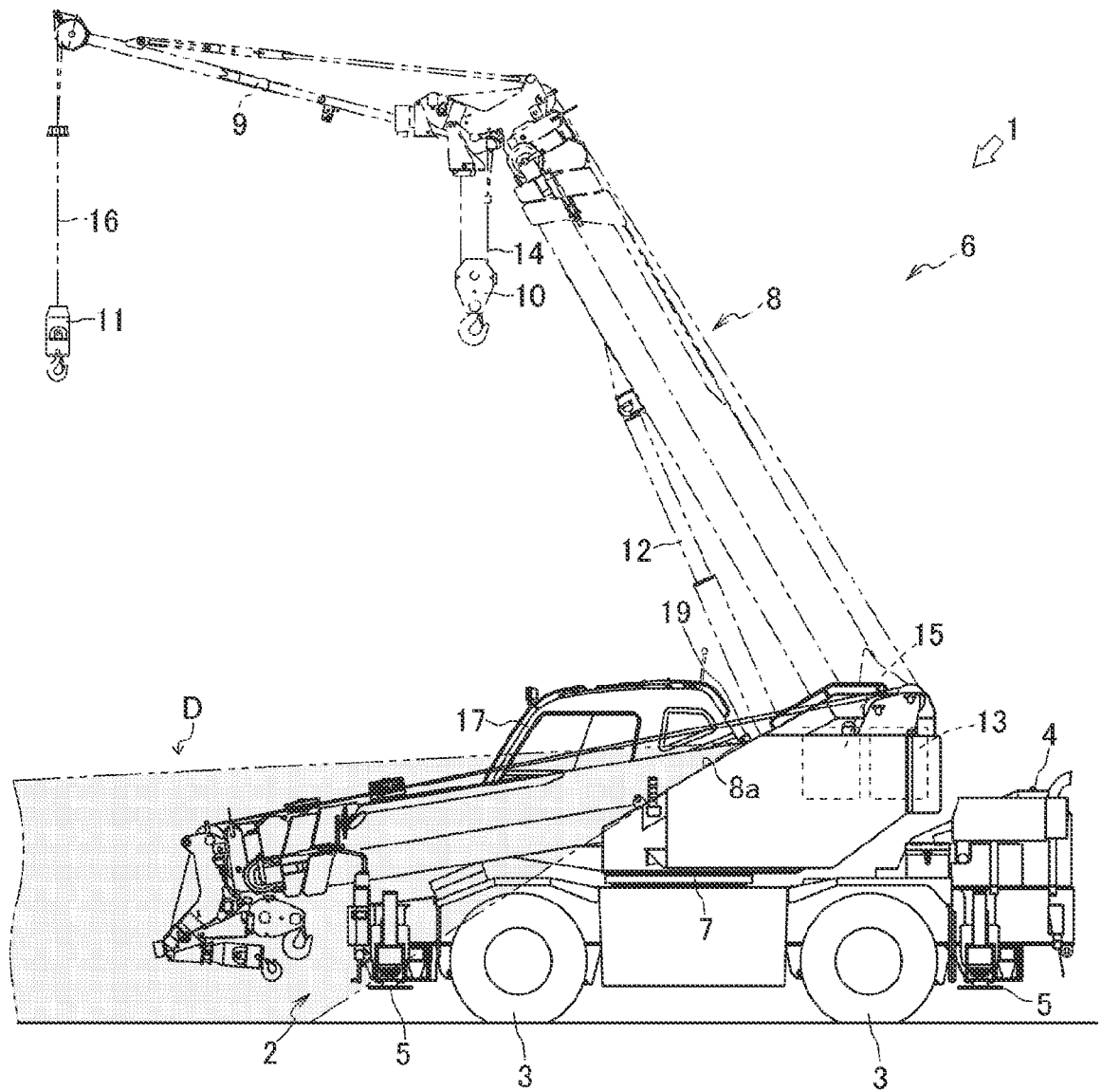
FIG. 1 is a side view illustrating an entire configuration of a crane and an image capture region of a camera according to one embodiment of the present invention.
Figure 2:
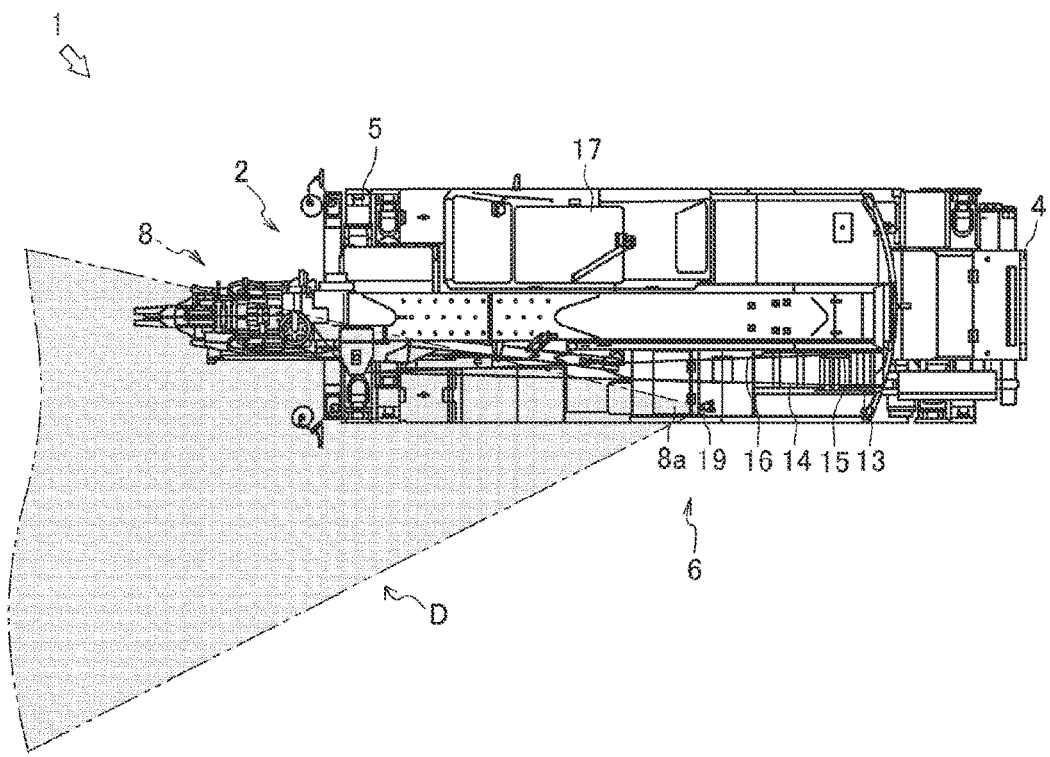
FIG. 2 is a plan view illustrating the entire configuration of the crane and the image capture region of the camera according to one embodiment of the present invention.

As illustrated in FIGS. 1 and 2, crane 1 as the work vehicle is mobile crane 1 that can be moved to an unspecified place. Crane 1 includes vehicle 2, crane device 6, and human detection system 18 (see FIG. 3).

Vehicle 2 carries crane device 6. Vehicle 2 includes a plurality of wheels 3, and travels using engine 4 as a power source. Vehicle 2 is provided with outriggers 5. Outriggers 5 are composed of projecting beams hydraulically extendable on both sides of vehicle 2 in the width direction and hydraulic jack cylinders extendable in the direction vertical to the ground. Vehicle 2 can extend a workable area of crane 1 by extending outriggers 5 in the width direction of the vehicle 2 and bringing the jack cylinders into contact with the ground.

Crane device 6 hoists up a conveyance object with a wire rope. Crane device 6 includes swivel base 7, telescopic boom 8, jib 9, main hook block 10, sub hook block 11, luffing cylinder 12, main winch 13, main wire rope 14, sub winch 15, sub wire rope 16, cabin 17, and the like.

Swivel base 7 allows crane device 6 to swivel. Swivel base 7 is disposed on a frame of vehicle 2 via an annular bearing. Swivel base 7 is configured to be rotatable by a hydraulic swivel motor, which is not illustrated, in one and the other directions around the center of the annular bearing serving as a rotational center.

Telescopic boom 8 supports the wire rope such that the conveyance object can be hoisted. Telescopic boom 8 is composed of a plurality of boom members. Telescopic boom 8 is configured to be extendible and retractable in the axial direction by moving the boom members by a telescopic cylinder, which is not illustrated. Telescopic boom 8 is disposed such that the base end of a base boom member can be swung at a substantial center of swivel base 7. Telescopic boom 8 is stored in a state of being luffed down with its tip on the forward side of vehicle 2. A boom support of telescopic boom 8, which is not illustrated, is disposed on the left side of telescopic boom 8 in the forward direction of vehicle 2 (hereinafter, the left side in the forward direction of vehicle 2 is simply referred to as "left side"). The boom support which is not illustrated is covered by boom support cover 8a. Telescopic boom 8 is thus configured to be horizontally rotatable and swingable on the frame of vehicle Jib 9 extends the lifting height and the operating radius of crane device 6. Jib 9 is held by a jib supporting part disposed in the base boom member of telescopic boom 8 such that the attitude of jib 9 is along the base boom member. The base end of jib 9 is configured to be able to be coupled to a jib supporting part of a top boom member.

Main hook block 10 is for hanging a conveyance object. Main hook block 10 is provided with a plurality of hook sheaves around which main wire rope 14 is wound, and a main hook for hanging the conveyance object. Sub hook block 11 is for hanging a conveyance object. Sub hook block 11 is provided with a sub hook for hanging the conveyance object.

Luffing cylinder 12 luffs up or down telescopic boom 8, and holds the attitude of telescopic boom 8. Luffing cylinder 12 includes a hydraulic cylinder made up of a cylinder part and a rod part. In luffing cylinder 12, an end of the cylinder part is swingably coupled to swivel base 7, and an end of the rod part is swingably coupled to the base boom member of telescopic boom 8.

Main winch 13 and sub winch 15, which are a hydraulic winch, wind up (reel up) and feed out (release) main wire rope 14 and sub wire rope 16. Main winch 13 has a configuration in which a main drum around which main wire rope 14 is wound is rotated by a main hydraulic motor, and sub winch 15 has a configuration in which a main drum around which sub wire rope 16 is wound is rotated by the main hydraulic motor.

Cabin 17 covers an operator compartment. Cabin 17 is mounted on swivel base 7. Cabin 17 is disposed on the right side of telescopic boom 8 in the forward direction of vehicle 2 (hereinafter, the right side in the forward direction of vehicle 2 is simply referred to as "right side") and along with telescopic boom 8. The operator compartment, which is not illustrated, is provided inside cabin 17. Various operating tools such as those for travel operation of vehicle 2, those for operation of crane device 6, and/or the like are provided in the operator compartment.

In crane 1 configured as described above, it is possible to move crane device 6 to any position by causing vehicle 2 to travel. Crane 1 can extend the lifting height and/or the operating radius of crane device 6 by luffing up telescopic boom 8 to any luffing angle with luffing cylinder 12, extending telescopic boom 8 to any length of telescopic boom 8, and/or coupling jib 9 to telescopic boom 8.

Hereinafter, human detection system 18 provided in crane 1 will be described with reference to FIGS. 1 to 9. In the present embodiment, since telescopic boom 8 is disposed on the left side of cabin 17 in crane 1, telescopic boom 8 makes it impossible to see the left side from the operator compartment in cabin 17. That is, there is a blind spot due to telescopic boom 8 in crane 1 on the left side of vehicle 2 as seen from the operator compartment in cabin 17. Note that, although human detection system 18 is provided in mobile crane 1 which is a work vehicle, human detection system 18 only has to be provided in an operator-on-board work vehicle.

Figure 3:
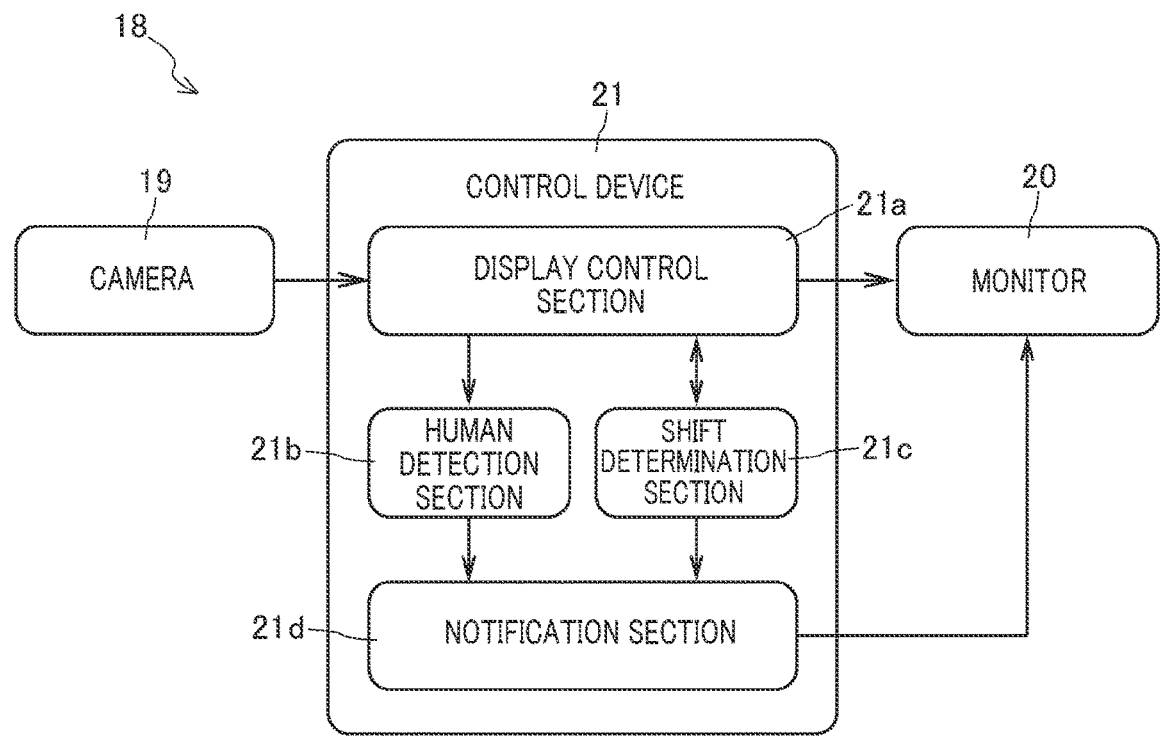
FIG. 3 is a block diagram illustrating a control configuration of the crane according to one embodiment of the present invention.

As illustrated in FIG. 3, human detection system 18 detects a human in detection region D. Human detection system 18 includes camera 19 that is an image data obtainment section, monitor 20 that is an image display section, a notification section (notification section 21d), and control device 21 (see FIG. 3).

Camera 19 as the image data obtainment section obtains image data. For example, camera 19 includes an optical system consisting of a plurality of lenses, and an imaging device such as a CCD, COMOS, and/or the like, and is configured to be able to obtain a video and/or a static image at a variable shutter speed. Camera 19 is mounted on swivel base 7. Camera 19 is disposed on boom support cover 8a on the left side of telescopic boom 8, Camera 19 is disposed on boom support cover 8a to face toward the forward side of vehicle 2. In addition, camera 19 is directed leftward with respect to the forward and rearward direction of vehicle 2 by a predetermined angle, and is directed downward with respect to the swivel plane of swivel base 7 by a predetermined angle. Configured as described above, camera 19 is attached so as to be able to obtain image data of a region including a forward left portion of vehicle 2 and a peripheral portion of the forward left portion, which region serves as an image capture region. That is, camera 19 is configured such that the forward left portion of vehicle 2 and its peripheral portion, which are the image capture region, are detection region D in which human detection is performed.

Monitor 20 as the image display section displays the image data. Monitor 20 is provided in the operator compartment in cabin 17, which operator compartment is not illustrated. Monitor 20 can display the image data obtained by camera 19 and/or notification information based on a signal from the notification section. Monitor 20 can also display reference figure Gs and assisting figure Ga (see FIG. 9) based on a signal from control device 21.

The notification section is a means for notifying, when detecting any human in the detection area and/or a shift of camera 19, the operator of such detection. The notification section displays the notification information on monitor 20, or give a notification by a buzzing sound or the like. The notification section, as notification section 21d being a part of control device 21, is integrally configured with control device 21 (see FIG. 3) in the present embodiment.

Control device 21 controls human detection system 18 as illustrated in FIG. 3. Control device 21 includes display control section 21a, human detection section 21b, shift determination section 21c, and notification section 21d that is the notification section. Control device 21 is provided in cabin 17. Substantively, control device 21 may have a configuration in which a CPU, ROM, RAM, HDD, and/or the like are connected to one another via a bus, or may be configured to consist of a one-chip LSI or the like. Control device 21 stores therein various programs and/or data in order to control operation of camera 19, monitor 20, human detection section 21b, shill determination section 21c, notification section 21d, and display control section 21a.

Display control section 21a is a part of control device 21, and controls the image data obtained by camera 19. Display control section 21a obtains the image data from camera 19, and displays the image data on monitor 20 in real time. Additionally, display control section 21a transmits the image data to human detection section 21b and shift determination section 21c.

Human detection section 21b is a part of control device 21, and detects a human in detection region D. Human detection section 21b is integrally configured with control device 21. Human detection section 21b detects, using any algorithm, a human in detection region D from detection image data Dd of detection region D (see FIGS. 1 and 2) that is the image capture region of camera 19 (see FIGS. 4A and 4B).

Shift determination section 21c is a part of control device 21, and determines whether or not detection region D is shifted in comparison with the image capture region of camera 19 at a reference position (hereinafter, such an image capture region is simply referred to as "reference region S" (see FIG. 7)). Shift determination section 21c is integrally configured with control device 21. Shift determination section 21c determines using any algorithm whether or not camera 19 captures, as detection region D, an image of the forward left portion of vehicle 2 and its peripheral portion which are predefined reference region S. In the present embodiment, shift determination section 21c determines a shift of camera 19 by comparing a histogram of angles of edges (outlines) in image data of a specific area with a histogram for the specific area in reference region S using a HOG feature value and an SVM learning algorithm described later.

In control device 21, display control section 21a is connected to camera 19, and human detection section 21b and shift determination section 21c of control device 21 can obtain the image data captured by camera 19.

Control device 21 is connected to monitor 20 and can display obtained image data, an alert sign, a figure, and/or the like on monitor 20.

Control device 21 computes the Histograms of Oriented Gradients (HOG) feature values of the image data by human detection section 21b from the image data obtained from camera 19. Further, human detection section 21b of control device 21 detects a human using Support Vector Machine (SVM) learning based on the computed HOG feature values.

Control device 21 computes the histograms of detection image data Dd and of reference image data Sd by shift determination section 21c from the image data obtained from camera 19. Further, shift determination section 21c of control device 21 identifies coordinates of a predetermined region in detection image data Dd and reference image data Sd based on the computed histograms, and determines whether or not detection image data Dd and reference image data Sd are shifted with respect to each other.

Figure 4A:
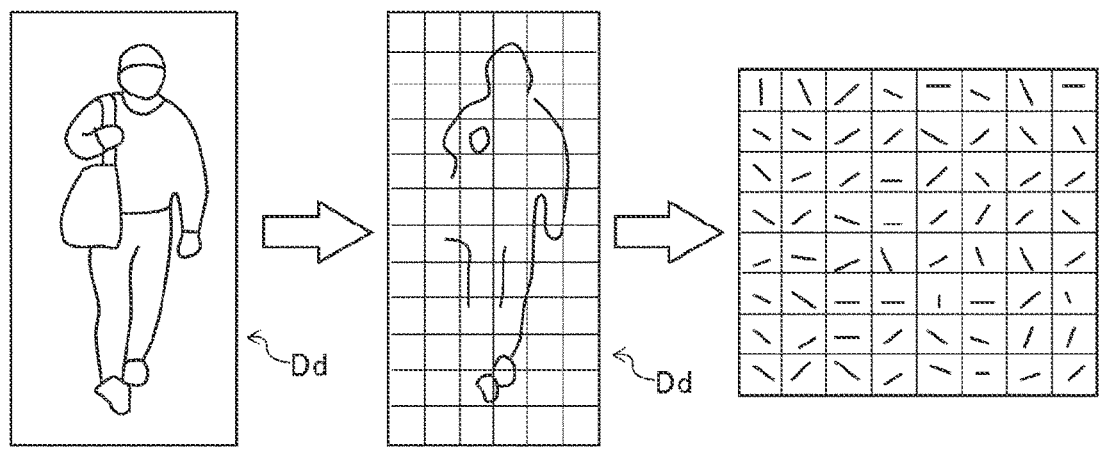
FIGS. 4A and 4B illustrate conceptual diagrams of image processing related to luminance gradients (FIG. 4A is a conceptual diagram illustrating luminance gradients sectionally divided from an image in the human detection system of one embodiment of the present invention, and FIG. 4B is a conceptual diagram illustrating a state where histograms are computed from the luminance gradients to be used as HOG feature values in the human detection system of one embodiment of the present invention)
Figure 4B:
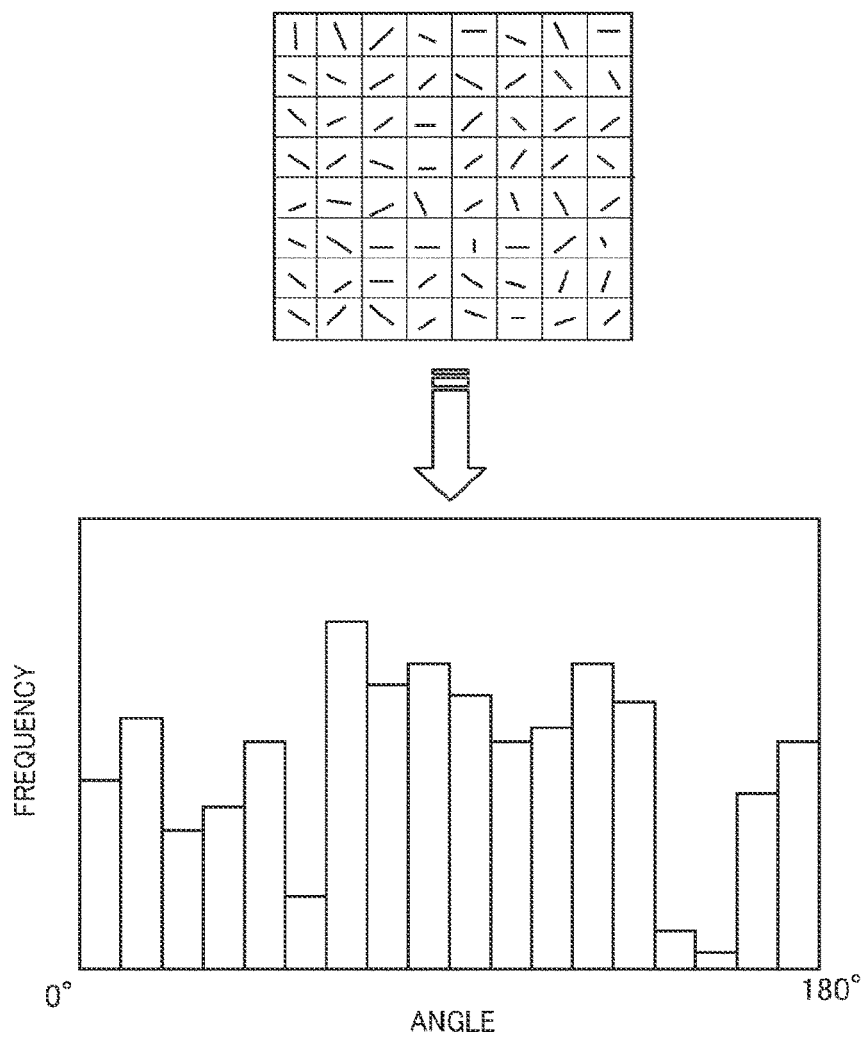

As illustrated in FIGS. 4A and 4B, the HOG feature values are such feature values as those computed based on gradient orientations of luminance in local regions (cells) represented as histogram on the basis of gradient strengths of luminance. As illustrated in FIG. 4A, human detection section 21b divides detection image data Dd in detection region D into the local regions, and computes the gradient orientations and the gradient strengths of luminance in the local regions. As illustrated in FIG. 4B, human detection section 21b represents, as histogram, the computed gradient orientations of luminance in the local regions on the basis of the gradient strengths of luminance. Further, human detection section 21b computes the HOG feature values by normalizing histograms in a plurality of local regions.

Figure 5:
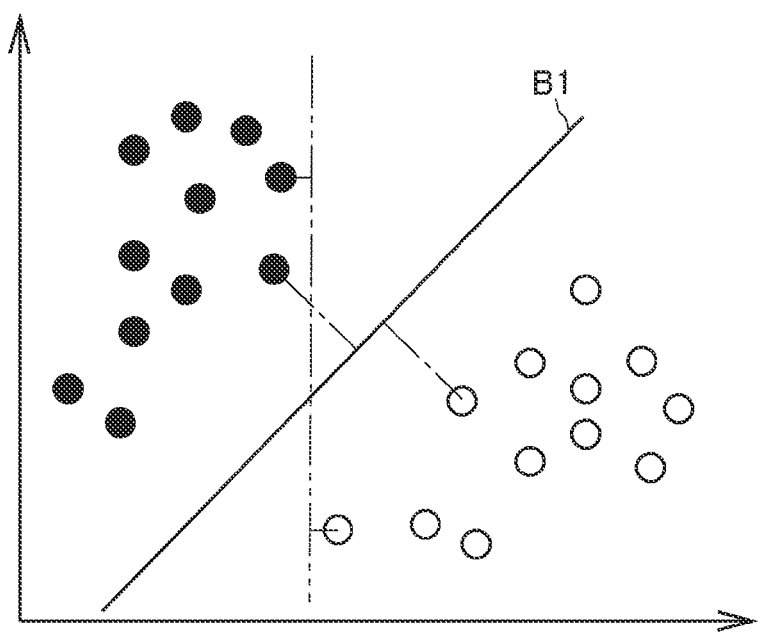
FIG. 5 is a conceptual diagram illustrating a discrimination boundary computed using SVM learning based on the HOG feature values in human detection control of the human detection system according to one embodiment of the present invention.

As illustrated in FIG. 5, the SVM learning is a method for pattern recognition of input data by computing, from HOG feature values of samples constituting a plurality of groups, a discrimination boundary formed by a maximum-margin hyperplane from which the Euclidean distances to the HOG feature values of the samples belonging to each of the groups are the greatest. Human detection section 21b computes, in advance, human discrimination boundaries B1 for discriminating a pedestrian group, a bicycle group, and a motorbike group from the other group.

Specifically, human detection section 21b computes, in advance, HOG feature values of a plurality of samples constituting the pedestrian group, bicycle group, motorbike group, and the like which are detection targets, and the other group. Among sets of the HOG feature values of the groups, human detection section 21b extracts, from each of the groups, one of the HOG feature values in the group which is located at a position closest to the other group, and computes human discrimination boundary 91 from which the Euclidean distance to the extracted HOG feature value is the greatest.

In human detection control, human detection section 21b obtains, from display control section 21a, detection image data Dd of detection region D obtained by camera 19. Human detection section 21b computes a HOG feature value from obtained detection image data. Dd. Human detection section 21b determines whether or not the HOG feature value of the obtained image data belongs to one of the groups by contrasting the HOG feature value with human discrimination boundary B1, for each of the groups to be discriminated, as computed in advance based on the SVM learning. When the HOG feature value of the obtained image data belongs to one of the groups, human detection section 21b transmits a signal to notify notification section 21d that a human is detected in detection region D.

Figure 6A:
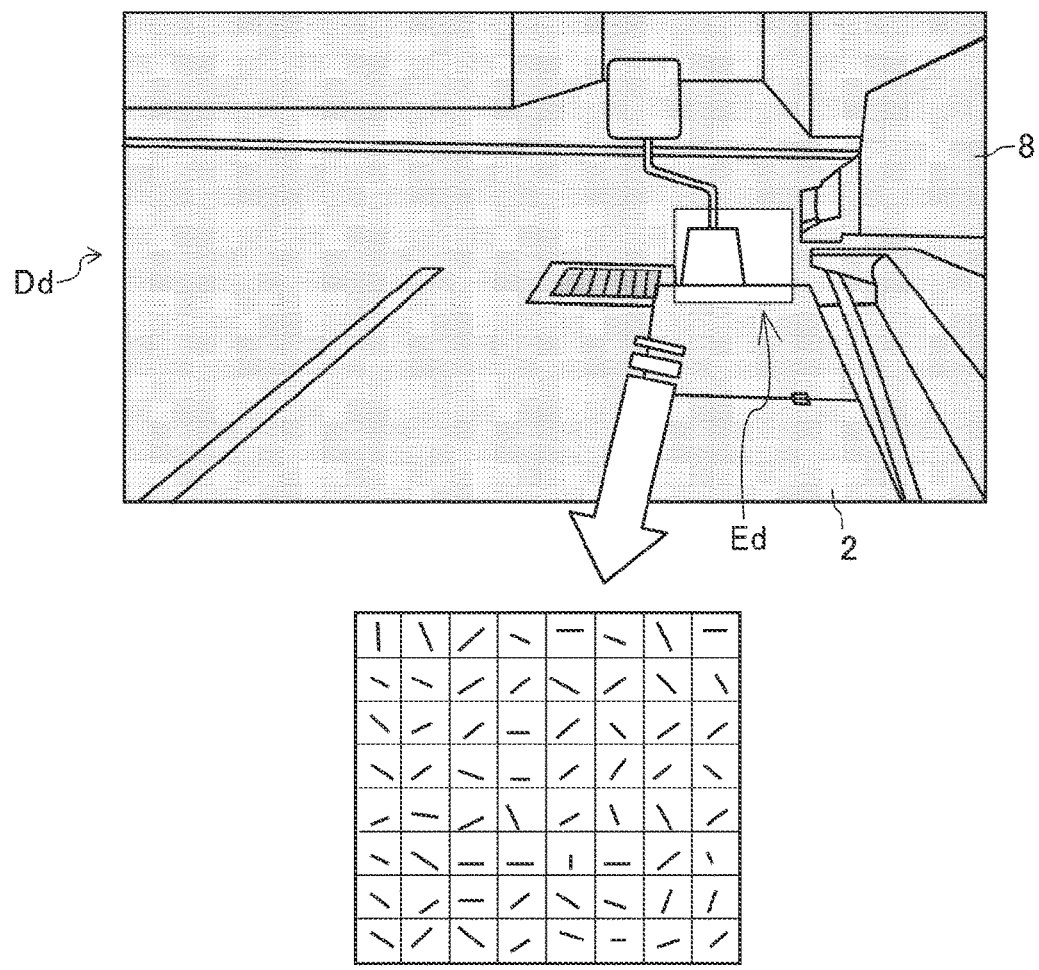
FIGS. 6A and 6B illustrate conceptual diagrams of image processing based on edge angles (FIG. 6A is a conceptual diagram illustrating a state of sectionally dividing image data of a determination area within a detection image data depending on the edge angles in shift determination control of the human detection system according to one embodiment of the present invention, and FIG. 6B is a conceptual diagram illustrating a state where histograms are computed from sectional gradients of edge angles in the shift determination control of the human detection system according to one embodiment of the present invention)
Figure 6B:
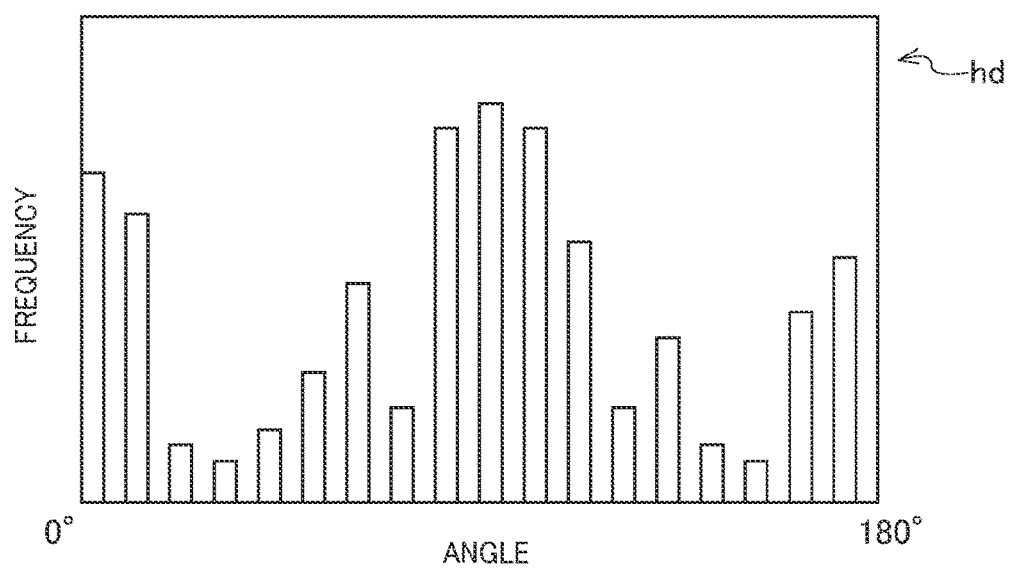

As illustrated in FIGS. 6A and 6B, shift determination section 21c uses the HOG feature values and the SVM learning algorithm so as to determine a shift of camera 19 by comparison between, on the one hand, the histogram of the angles of the edges (outlines) in the image data of a predetermined specific area within detection region D that is the image capture region of camera 19 at any time point, and, on the other hand, the histogram of the image data of the specific area in reference region S.

Shift determination section 21c computes reference histogram h(n) of a specific area of a shape of a predetermined size over the entire area of reference image data Sd of reference region S obtained in advance, Specifically, shift determination section 21c divides reference image data Sd into local regions, and computes the angles of edges in the local regions and their frequencies. Shift determination section 21c represents, as histogram, the computed angles of the edges in the local regions on the basis of their frequencies. Further, shift determination section 21c computes, over the entire area of reference image data Sd, reference histograms h(n) for positions of the specific areas which are resulted by normalization of histograms for a plurality of local regions included in each of the specific areas which are obtained while minimally shifting from one position to another of the specific area.

In addition, based on similarities between reference histogram h(k) of one specific area in reference image data Sd and reference histograms h(s), h(s+1), h(s+2), of a plurality of other specific areas, shift determination section 21c computes, in advance, image discrimination boundary B2 from which the Euclidean distances to the similarities are the greatest. Specifically, shift determination section 21c computes a plurality of reference histograms h(s), h(s+1), h(s+2), . . . in reference image data Sd. Shift determination section 21c sets scanning areas in reference image data Sd around one of the specific areas for which reference histogram h(k) is computed. Shift determination section 21c scans the scanning areas with reference histogram h(k), and computes a similarity to reference histogram h(k) at each scanning position for each of reference histograms h(s), h(s+1), h(s+2), . . . . Among a group of similarities close to one (1) (high similarity group) and the other group (low similarity group), shift determination section 21c extracts a similarity closest to the other group from each of the groups, and computes image discrimination boundary B2 from which the Euclidean distances to the extracted similarities are the greatest (see FIG. 5).

In the shift determination control, shift determination section 21c obtains, from display control section 21a, detection image data Dd of detection region D obtained at any time point by camera 19 disposed in any state (see FIG. 3). In obtained detection image data Dd of detection region D, shift determination section 21c cuts out, from detection image data Dd, image data of determination area Ed that is a predetermined area for which similarities are determined. Shift determination section 21c divides the image data of determination area Ed into local regions, and computes the angles of edges in the local regions and their frequencies. As illustrated in FIG. 6B, shift determination section 21c represents, as histogram, the computed angles of the edges in the local regions on the basis of their frequencies. Further, shift determination section 21c computes determination histogram hd resulted by normalization of histograms in the local regions of determination area Ed.

Figure 7A:
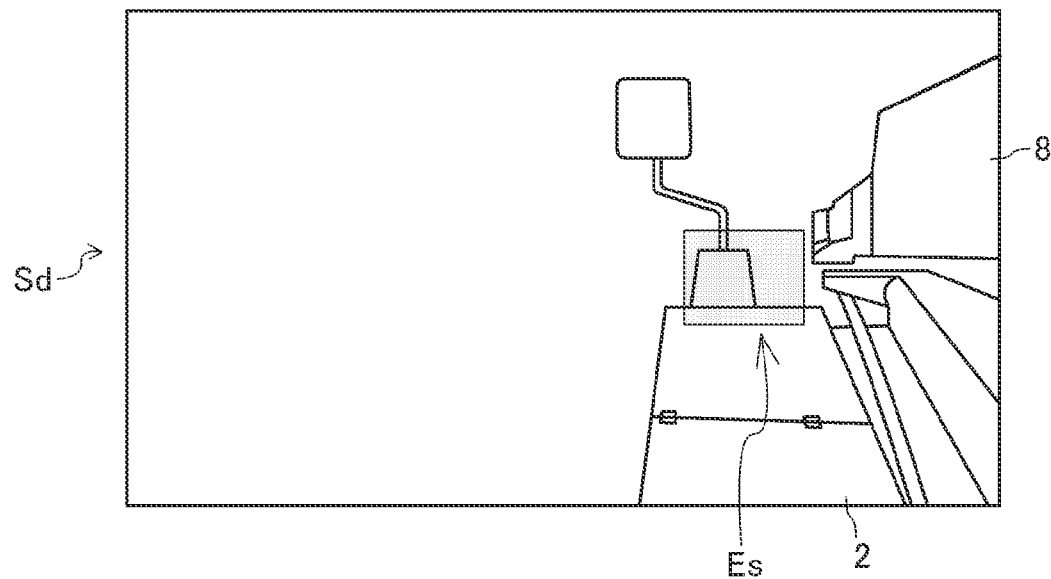
FIGS. 7A and 7B are conceptual diagrams of image processing using reference image data (FIG. 7A illustrates a state where a similar area similar to the determination area is identified in the reference image data in the shift determination control of the human detection system according to one embodiment of the present invention, and FIG. 7B is a conceptual diagram illustrating a state where a histogram of the determination area is compared with a histogram of the similar area)

As illustrated in FIG. 7A, shift determination section 21c computes similarities of reference histograms h(n) to determination histogram hd of computed determination area Ed in reference image data Sd. Similar area Es having reference histogram h(r) with the highest similarity (closest to one (1)) among the computed similarities is identified.

Figure 7B:
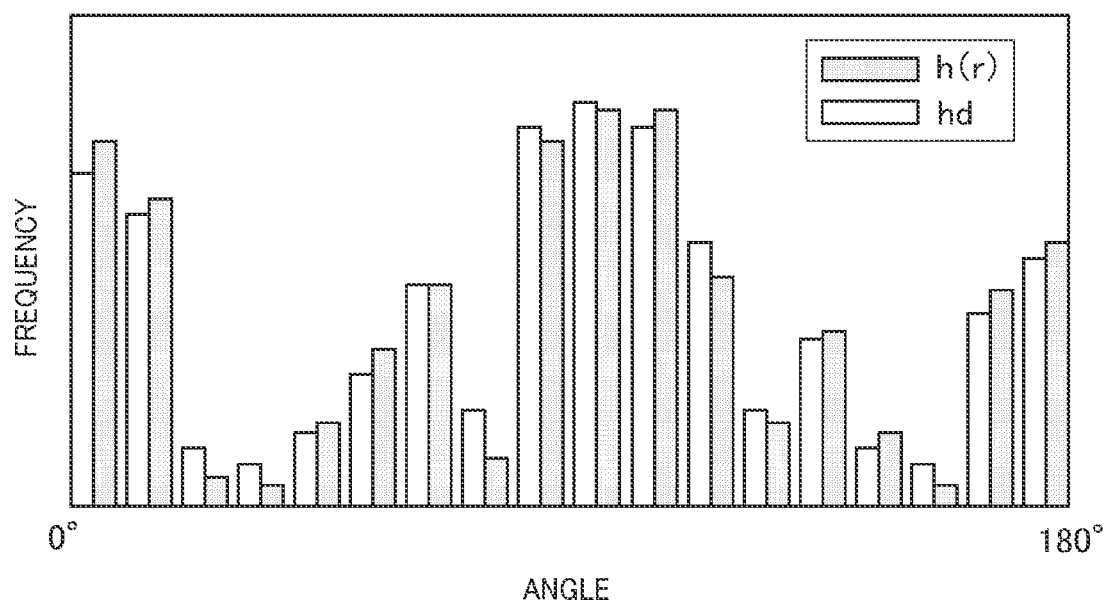

As illustrated in FIG. 7B, shift determination section 21c determines to which of the high similarity group and the low similarity group the highest similarity belongs by contrasting the highest similarity to image discrimination boundary B2. When the highest similarity belongs to the high similarity group (that is, when the similarity between determination histogram hd and reference histogram h(r) is high), shift determination section 21c determines that the image data of determination area Ed and the image data of similar area Es match.

Figure 8:
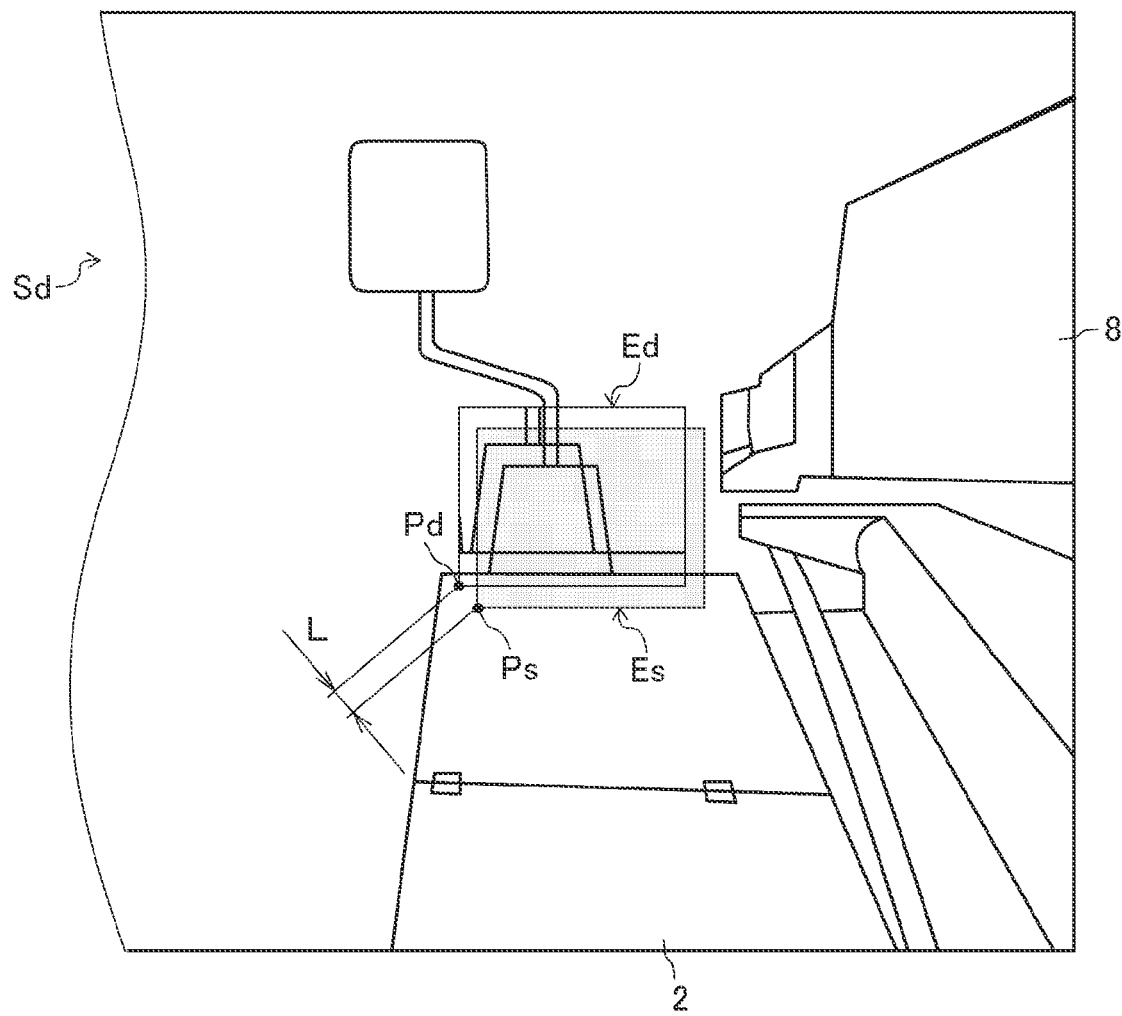
FIG. 8 is a conceptual diagram illustrating a state of computing the Euclidean distance between a coordinate of the determination area and a coordinate of the similar area in the shift determination control of the human detection system according to one embodiment of the present invention.

As illustrated in FIG. 8, shift determination section 21c compares predetermined coordinate Pd of determination area Ed in detection image data Dd with predetermined coordinate Ps of identified similar area Es in reference image data Sd. Shift determination section 21c determines that detection region D is shifted with respect to reference region S, when Euclidean distance L between coordinate Pd and coordinate Ps is greater than tolerable value T. Identifying similar area Es that is similar to determination area Ed and determining based on Euclidean distance L whether the coordinates are shifted with respect to each other are performed by shift determination section 21c multiple times, and, when it is determined at predetermined number of times N consecutively that detection region D is shifted with respect to reference region 5, the determination that detection region D is shifted with respect to reference region S is fixed. That is, shift determination section 21c determines that the position of camera 19 including an attachment angle, an attachment position, and the like of camera 19 is shifted with respect to the reference position of camera 19.

Figure 9A:
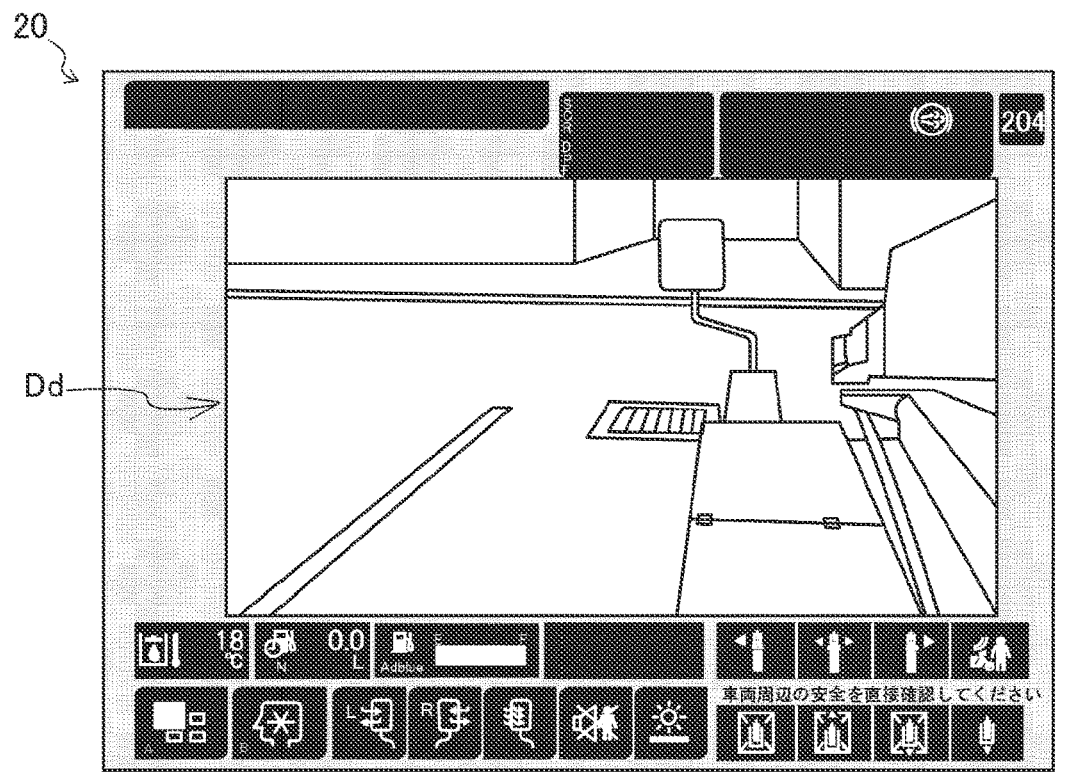
FIGS. 9A and 9B illustrate a mode of displaying a reference (FIG. 9A illustrates a detection image data in which neither a reference figure nor an assisting figure is displayed in the shift determination control of the human detection system according to one embodiment of the present invention, and FIG. 9B illustrates the detection image data in which the reference figure and the assisting figure are displayed in the shift determination control of the human detection system according to one embodiment of the present invention)
Figure 9B:
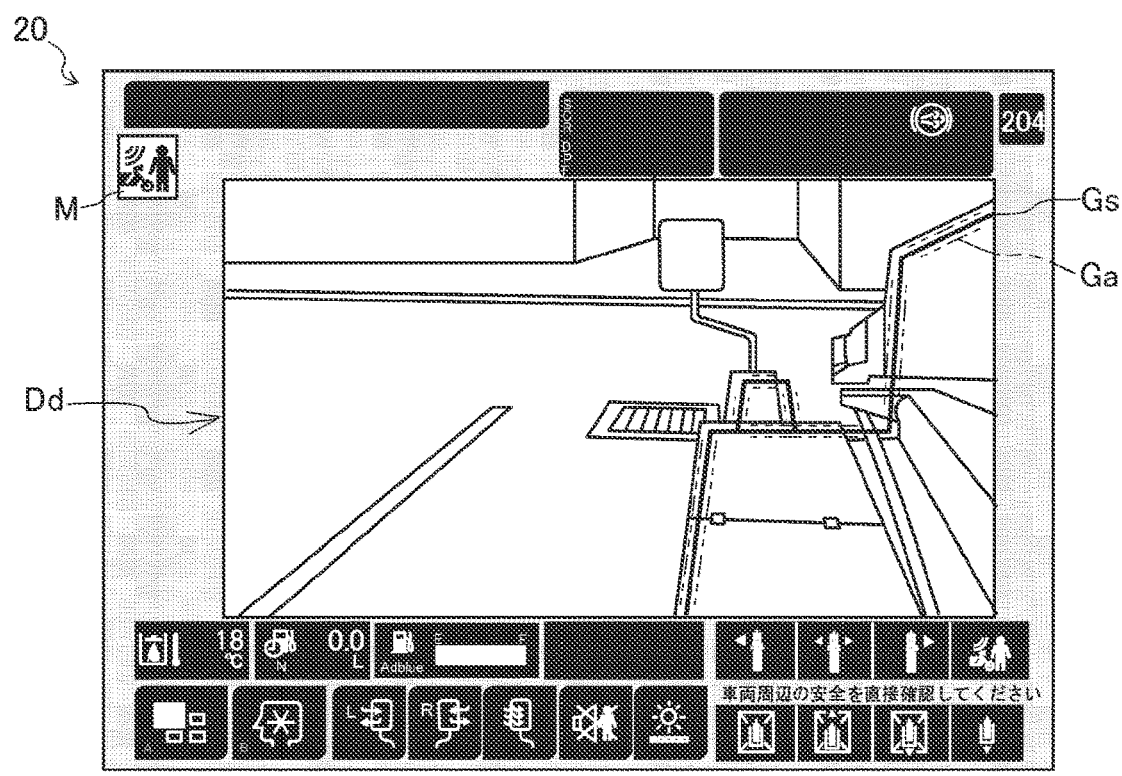

As illustrated in FIGS. 9A and 9B, shift determination section 21c transmits, to notification section 21d, a positional shift signal indicating that position adjustment of camera 19 is necessary, and also displays, via display control section 21a, reference FIG. Gs and/or assisting figure Ga superimposed on detection image data. Dd. Upon receiving the positional shift signal, notification section 21d displays, on monitor 20, mark M and/or a text indicating the receipt of the positional shift, or produces a buzzing sound.

Reference figure G is is a figure used as reference for adjusting the position of camera 19. Reference figure (is is constituted in reference region S by the left side surface of vehicle 2 and/or the outline of the left rearview mirror that are always included in reference image data Sd (thick solid line in FIG. 9B). Assisting figure Ga is a figure indicating an adjustment width for adjusting the position of camera 19 (thin two-dot chain line in FIG. 9B). Assisting figure Ga is formed by a figure indicating a tolerable shift width for the position of camera 19. That is, assisting figure Ga shows the adjustment width with reference figure Gs located in the middle thereof, within which the position of camera 19 is not regarded as shifted.

When shift determination section 21c determines in the shift determination control that detection region D and reference region S are not shifted with respect to each other, shift determination section 21c eliminates displayed reference figure Gs and assisting figure Ga via display control section 21a and transmits a signal indicative of absence of any positional shift to notification section 21d. Upon receiving the signal indicative of absence of any positional shift, notification section 21d eliminates the mark and/or the text indicating the presence of the positional shift and being displayed on monitor 20, or stops a buzzing sound.

In the following, control of determining a positional shift of camera 19 in human detection system 18 of crane 1 will be specifically described with reference to FIGS. 10 to 12. The present embodiment will be described in relation to crane 1 whose power is just turned on. In addition, human detection section 21b of control device 21 computes in advance human discrimination boundaries B1 of HOG feature values for detecting a human. Further, it is presupposed that shift determination section 21c of control device 21 has obtained reference image data Sd in advance, has computed reference histogram h(n) for each specific area over the entire area of reference image data Sd, and has computed image discrimination boundary B2 of similarities for determining a similarity between reference histogram h(n) and determination histogram hd of determination area Ed.

Human detection system 18 starts the control when the power of crane 1 is turned on. To begin with, control device 21 of human detection system 18 starts the human detection control by human detection section 21b. Human detection section 21b obtains detection image data Dd of detection region D from camera 19 via display control section 21a, and computes HOG feature values. Human detection section 21b determines, from the HOG feature values, whether or not there is a human in detection region D. Next, control device 21 starts the shift determination control by shift determination section 21c.

Shift determination section 21c computes determination histogram hd of determination area Ed from detection image data. Dd of detection region D obtained from camera 19 via display control section 21a. Shift determination section 21c identifies similar area Es in reference image data Sd that is similar to computed determination area Ed. Shift determination section 21c determines that detection region D is shifted with respect to reference region S when Euclidean distance L between coordinate Pd of determination area Ed in detection image data Dd and coordinate Ps of identified similar area Es in reference image data Sd is greater than tolerable value T, and displays, via display control section 21a, reference future Gs and assisting figure Ga superimposed on detection image data Dd.

Figure 10:
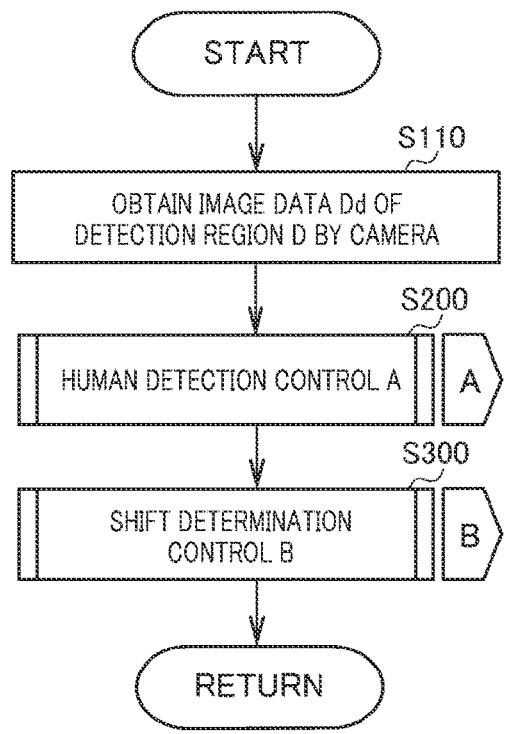
FIG. 10 is a flowchart indicating a control mode of the entire human detection system according to one embodiment of the present invention.

As illustrated in FIG. 10, control device 21 obtains detection image data Dd of detection region D from camera 19 at step S110, and proceeds to step S200.

Figure 11:
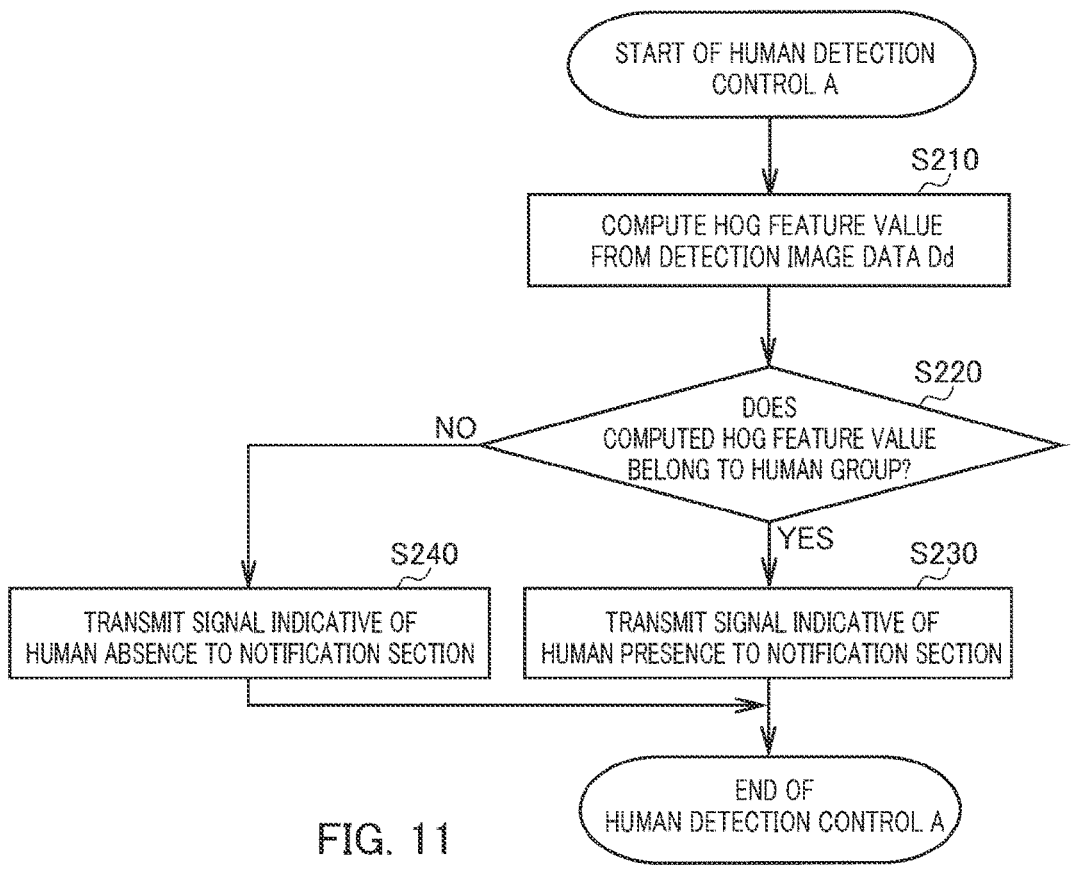
FIG. 11 is a flowchart indicating a control mode of the human detection control of the human detection system according to one embodiment of the present invention.

Control device 21 starts human detection control A at step S200, and proceeds to step S210 (see FIG. 11). Subsequently, the end of human detection control A is followed by proceeding to step S300 (see FIG. 10).

Figure 12:
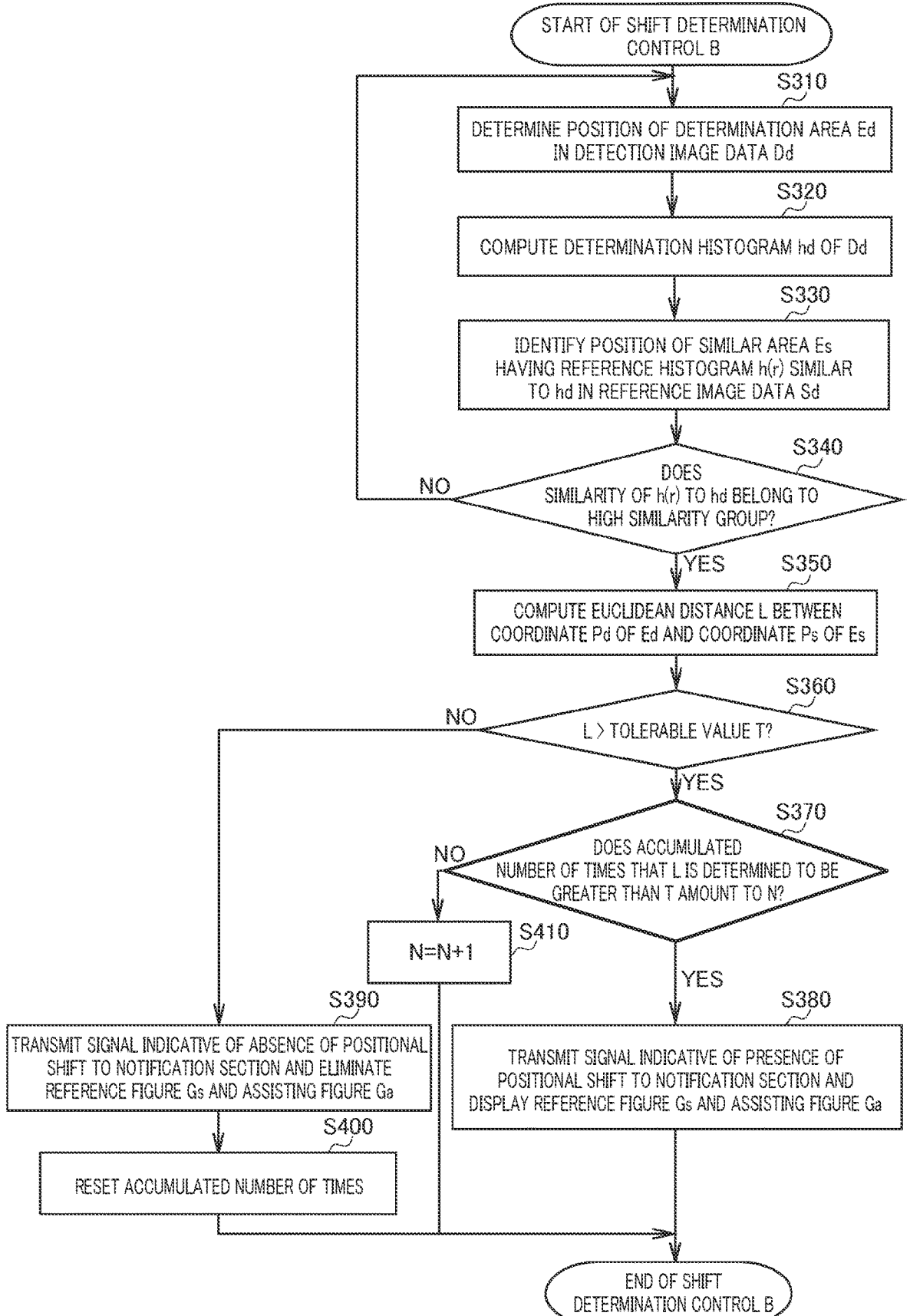
FIG. 12 is a flowchart indicating a control mode of the shift determination control of the human detection system according to one embodiment of the present invention.

Control device 21 starts shift determination control B at step S300, and proceeds to step S310 (see FIG. 12). Subsequently, the end of shift determination control B is followed by proceeding to step S110 (see FIG. 10).

As illustrated in FIG. 11, control device 21 starts human detection control A, computes the HOG feature values from obtained detection image data Dd at step S210, and proceeds to step S220.

By contrasting the computed HOG feature values to human discrimination boundaries B1, control device 21 determines at step S220 whether or not the computed HOG feature values belong to one of the human groups consisting of the pedestrian group, bicycle group, and motorbike group and having an HOG feature value including a human.

When the determination result indicates that the computed HOG feature values belong to one of the pedestrian group, the bicycle group, and the motorbike group, control device 21 proceeds to step S230.

On the other hand, when the computed HOG feature values do not belong to any of the pedestrian group, the bicycle group, and the motorbike group (that is, when the computed HOG feature values are not of a human), control device 21 proceeds to step S240.

Control device 21 transmits a signal indicative of human presence to notification section 21d to indicate that a human is detected in detection region D at step S230, ends human detection control A, and proceeds to step S300 (see FIG. 10).

Control device 21 transmits a signal indicative of human absence to notification section 21d to indicate that no human is detected in detection region D at step S240, ends human detection control A, and proceeds to step S300 (see FIG. 10).

As illustrated in FIG. 12, control device 21 starts shift determination control B, uses image data obtained from camera 19 as detection image data Dd of detection region D, determines at step S310 the position of determination area Ed that is a predetermined area in detection image data. Dd for which similarities are determined, and proceeds to step S320.

Control device 21 computes determination histogram hd from image data at the determined position of determination area Ed at step S320, and proceeds to step S330.

Control device 21 identifies, in reference image data Sd, the position of similar area Es that is a predetermined area having reference histogram h(r) with the highest similarity to computed determination histogram hd at step S330, and proceeds to step S340.

At step S340, control device 21 determines, by contrasting the similarity between computed determination histogram hd and identified reference histogram h(r) to image discrimination boundary B2, whether or not the similarity belongs to one of the high similarity group and the low similarity group.

When the determination result indicates that the similarity between computed determination histogram hd and identified reference histogram h(r) belongs to the high similarity group, control device 21 proceeds to step S350.

On the other hand, when the similarity between computed determination histogram hd and identified reference histogram h(r) belongs to the low similarity group, control device 21 proceeds to step S310.

Control device 21 computes Euclidean distance L between predetermined coordinate Pd of determined determination area Ed and predetermined coordinate Ps of identified similar area Es at step S350, and proceeds to step S360.

Control device 21 determines at step S360 whether or not computed Euclidean distance L is greater than tolerable value T.

When the determination result indicates that computed Euclidean distance L is greater than tolerable value T, control device 21 proceeds to step S370.

On the other hand, when computed Euclidean distance L is not greater than tolerable value T, control device 21 proceeds to step S390.

Control device 21 determines at step S370 whether or not the accumulated number of times computed Euclidean distance L is determined to be greater than tolerable value T is N.

When the determination result indicates that the accumulated number of times computed Euclidean distance L is determined to be greater than tolerable value T is N, control device 21 proceeds to step S380.

On the other hand, when the accumulated number of times computed Euclidean distance L is determined to be greater than tolerable value is less than N, control device 21 proceeds to step S410.

At step S380, control device 21 fixes the determination that detection region D is shifted with respect to reference region S, transmits to notification section 21d a signal indicative of presence of a positional shift to indicate that position adjustment of camera 19 is necessary, displays reference figure Gs and assisting figure Ga on monitor 20 via display control section 21a, ends shift determination control B, and proceeds to step S110 (see FIG. 10).

Control device 21 transmits to notification section 21d a signal indicative of absence of any positional shift to indicate that the position adjustment of camera 19 is not necessary, and eliminates reference figure Gs and assisting figure Ga displayed on monitor 20 at step S390, and control device 21 proceeds to step S400.

Control device 21 resets, at step S400, accumulated number of times N computed Euclidean distance L is determined to be greater than tolerable value T, ends shift determination control B, and proceeds to step S110 (see FIG. 10).

Control device 21 adds, at step S410, one (1) to accumulated number of times N computed Euclidean distance L is determined to be greater than tolerable value T (N=N+1), ends shift determination control B, and proceeds to step S110 (see FIG. 10).

Configured as described above detection system 18 and crane 1 provided with human detection system 18 easily determine, while the power is turned on, whether or not there is a human by utilizing the HOG feature values of the image data of detection region D and contrasting the HOG feature values to human discrimination boundaries B1 computed in advance based on the SVM learning. Moreover, human detection system 18 and crane 1 provided with human detection system 18 easily superimpose detection image data Dd on reference image data Sd by utilizing the similarity between reference histogram h(n) of the edge angles in the image data of the specific area of reference region S and determination histogram hd of the edge angles in the image data of the specific area of detection region D. Further, determination of whether or not detection region D is shifted with respect to reference region S is easily performed based on Euclidean distance L between the coordinates of the superimposed image data. Furthermore, in a case where detection region D is shifted with respect to reference region 5, displaying reference figure Gs on detection region D in a superimposed manner makes it possible to easily align camera 19. Human detection system 18 and crane 1 provided with human detection system 18 can thus assist determination of whether or not detection region D for which detection image data Dd is obtained by camera 19 is shifted with respect to reference region S.

Figure 13:
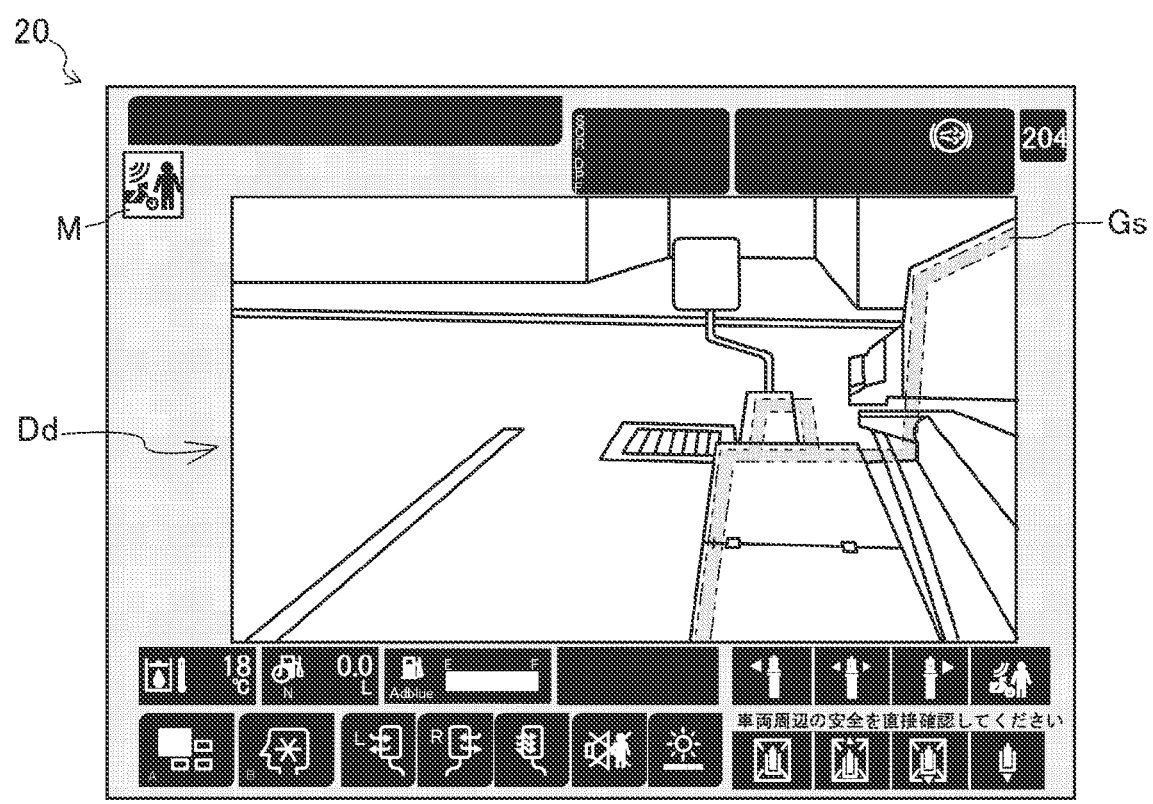
FIG. 13 illustrates a detection image data in which a reference figure indicating an adjustment width is displayed in the shift determination control of the human detection system according to one embodiment of the present invention.

Note that, although for human detection system 18 and crane 1 provided with human detection system 18 in the present embodiment, camera 19 is disposed such that detection area D is on the forward left side of crane 1, a plurality of cameras 19 may be provided such that blind spots on the rearward left side, the rearward right side, and/or the like of crane 1 are included in detection area. D. Note also that, while human detection system 18 and crane 1 provided with human detection system 18 display reference figure Gs and assisting figure Ga on monitor 20, only reference figure Gs may be displayed. Note also that, reference figure Gs and assisting figure Ga may be displayed on monitor 20 at any timing by a display switch or the like. Note also that, the width of outline of reference figure Gs may be constituted by the line width of the tolerable shift width for the position of camera 19 as illustrated in FIG. 13.

The embodiment described above showed only a typical form, and can be variously modified and carried out within the range without deviation from the main point of one embodiment. Further, it is needless to say that the present invention can be carried out in various forms, and the scope of the present invention is indicated by the descriptions of the claims, and includes the equivalent meanings of the descriptions of the claims and every change within the scope.

INDUSTRIAL APPLICABILITY

The present invention is applicable to a human detection system for a work vehicle and a work vehicle provided with the human detection system.

REFERENCE SIGNS LIST

1 Crane
18 Human detection system
19 Camera
21 Control device
21a Display control section
21b Human detection section
21c Shift determination section
21d Notification section
D Detection region
Dd Detection image data
Sd Reference image data

The invention claimed is:

1. A human detection system for a work vehicle, the human detection system comprising:
an image data obtainment section that obtains detection image data of a detection region, wherein a predetermined region including a part of the work vehicle is set to be the detection region;
a shift determination section that determines whether a position of the image data obtainment section is shifted with respect to a reference position, the determination being made by comparison between the detection image data and reference image data of the detection region, the detection image data being obtained by the image data obtainment section at any time point, wherein image data of the work vehicle included in the detection image data obtained by the image data obtainment section disposed at the reference position is set to be the reference image data of the detection region;
a notification section that notifies that the position of the image data obtainment section is shifted; and
an image display section; wherein,
when the shift determination section determines whether the position of the image data obtainment section is shifted with respect to the reference position, the shift determination section, by using a Support Vector Machine (SVM) learning algorithm, compares between the detection image data obtained by the image data obtainment section at any time point and the reference image data of the detection region, and
when the shift determination section determines that the position of the image data obtainment section is shifted, a confirmatory figure based on the reference image data is displayed on the image display section in such a manner as to be superimposed on image data of the detection region.

2. A work vehicle, comprising the human detection system for the work vehicle according to claim 1.

* * * * *